United States Patent
Tynys et al.

(10) Patent No.: US 9,234,303 B2
(45) Date of Patent: Jan. 12, 2016

(54) MELT BLOWN FIBERS OF POLYPROPYLENE COMPOSITIONS

(75) Inventors: Antti Tynys, Linz (AT); Joachim Fiebig, St. Marien (AT); Pascal Perrillat-Collomb, Linz (AT)

(73) Assignee: Borealis AG, Vienna (AT)

( * ) Notice: Subject to any disclaimer, the term of this patent is extended or adjusted under 35 U.S.C. 154(b) by 855 days.

(21) Appl. No.: 13/508,785

(22) PCT Filed: Nov. 11, 2010

(86) PCT No.: PCT/EP2010/067324
§ 371 (c)(1),
(2), (4) Date: Jun. 28, 2012

(87) PCT Pub. No.: WO2011/058118
PCT Pub. Date: May 19, 2011

(65) Prior Publication Data
US 2012/0270039 A1    Oct. 25, 2012

(30) Foreign Application Priority Data

Nov. 16, 2009 (EP) .................... 09176063

(51) Int. Cl.
| | |
|---|---|
| *C08L 23/00* | (2006.01) |
| *D01F 6/46* | (2006.01) |
| *C08L 23/10* | (2006.01) |
| *D01D 5/098* | (2006.01) |
| *C08L 23/14* | (2006.01) |

(52) U.S. Cl.
CPC . *D01F 6/46* (2013.01); *C08L 23/10* (2013.01); *D01D 5/0985* (2013.01); *C08L 23/14* (2013.01); *C08L 2205/02* (2013.01); *C08L 2205/03* (2013.01); *C08L 2205/16* (2013.01); *Y10T 428/268* (2015.01); *Y10T 428/298* (2015.01)

(58) Field of Classification Search
CPC ....... C08L 23/10; C08L 23/14; D01D 5/0985; D01F 6/46
See application file for complete search history.

(56) References Cited

U.S. PATENT DOCUMENTS 5,629,080 A * 5/1997 Gupta et al. .................. 428/373
7,491,770 B2 * 2/2009 Autran et al. ................. 525/191

FOREIGN PATENT DOCUMENTS

| WO | WO 2005/052052 A1 | 6/2005 |
| WO | 2006065663 A1 | 6/2006 |
| WO | WO 2009/026207 A1 | 2/2009 |
| WO | WO 2010/016970 A1 | 2/2010 |

OTHER PUBLICATIONS

Chinese Office Action Mailed Sep. 24, 2013.

* cited by examiner

*Primary Examiner* — Nathan M Nutter
(74) *Attorney, Agent, or Firm* — Tarolli, Sundheim, Covell & Tummino LLP

(57) ABSTRACT

Polypropylene composition comprising a polypropylene having a melt flow rate $MFR_2$ (230° C.) of at least 450 g/10 min and a molecular weight distribution (MWD) of not more than 3.5, a polypropylene having a melt flow rate $MFR_2$ (230° C.) of equal or below 20 g/10 min, wherein the composition has a melt flow rate $MFR_2$ (230° C.) of at least 200 g/10 min.

10 Claims, 1 Drawing Sheet

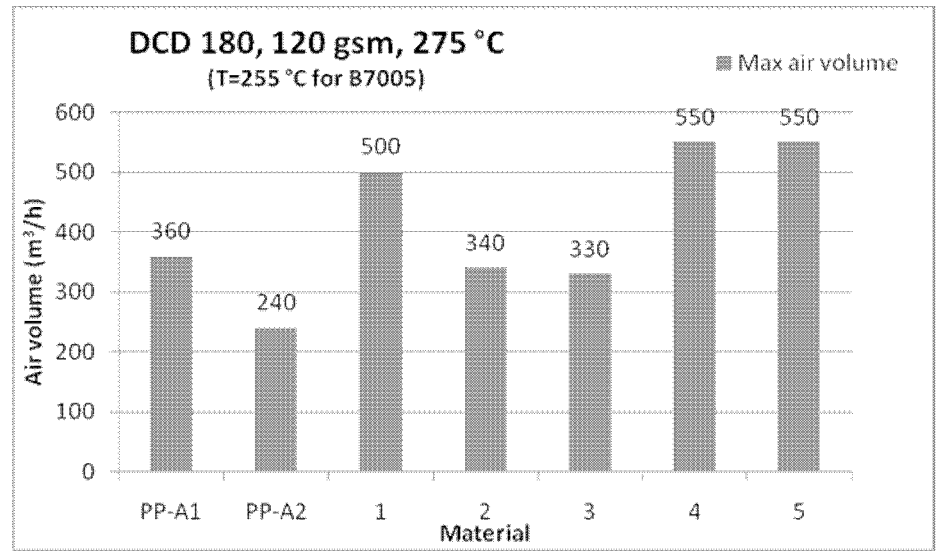
Figure 1:    Maximum applicable air volumes
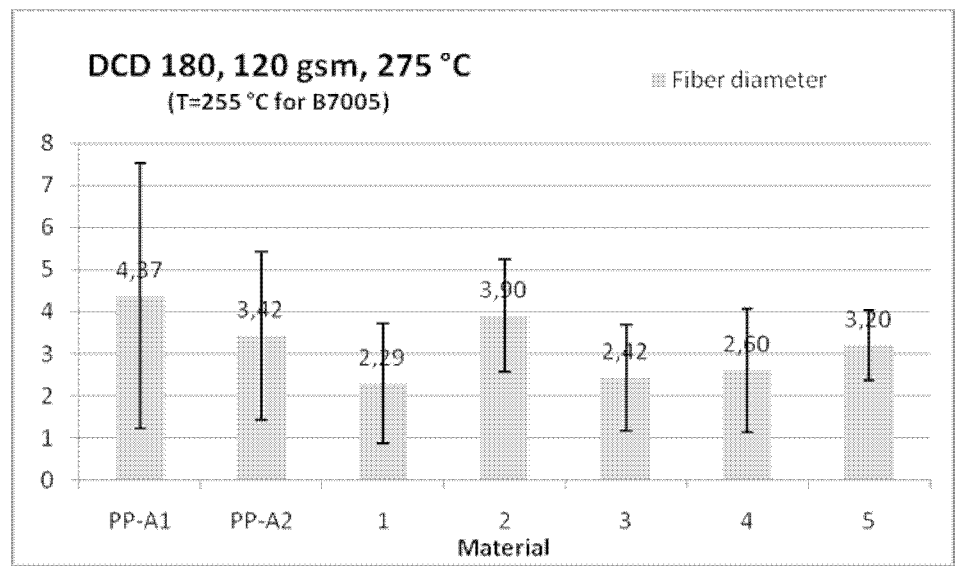
Figure 2. Average fiber diameter

MELT BLOWN FIBERS OF POLYPROPYLENE COMPOSITIONS

RELATED APPLICATION

This application corres. to PCT/EP2010/067324, filed Nov. 11, 2010, which claims priority from European Application No. 09176063.7, filed Nov. 16, 2009, the subject matter which is incorporated herein by reference in its entirety.

The present invention is direct to a new polypropylene composition, melt blown fibers comprising said polypropylene composition as well as to its use to improve the stretching strength in melt blown fiber processing.

A melt blown web, being a non-woven structure consisting of melt blown fibers, is typically made in a one-step process in which high-velocity air blows a molten thermoplastic resin from an extruder die tip onto a conveyor or take-up screen to form fine fibered self-bonding web. In is several end use applications non-wovens consisting of fibers with small average fiber diameter are required. Therefore, the focus has been on developing novel polymer resins which can be used in melt blown process to produce thinner fibers in industrially feasible production conditions. Especially, optimal filtration media have a mean fiber diameter below 1 µm. In melt blown process the fiber attenuation is limited by fly formation. In fly formation the polymer fiber is broken during stretching between the die and the belt, and broken filaments are released from the web. In order to achieve thinner fibers, the polymer resin has to tolerate higher air volumes without filament breakage which should result into thinner average fiber diameter. Especially in the case of reactor made metallocene polypropylene resin the thinnest achievable average fiber diameter has been relatively high, while these polymers offer significant advantages in terms of purity and absence of peroxide residues.

BRIEF DESCRPTION OF THE DRAWINGS

FIG. 1 illustrates the maximum applicable air volumes.
FIG. 2 illustrates the average fiber diameter.

In US 2005/0,182,198-A1 a polymer composition is disclosed comprising 70 to 90 wt.-% of a polypropylene with melt flow rate $MFR_2$ (230° C.) of 30 to 400 g/10 min and 30 to 10 wt.-% of a polypropylene with melt flow rate $MFR_2$ (230° C.) 0.1 to 30 g/10 min. However no information is provided as to how the preparation of non-wovens can be economically improved.

In US 2005/0,165,173-A1 a polymer composition is disclosed comprising a first polypropylene with melt flow rate $MFR_2$ (230° C.) of 5 to 25 g/10 min and melting temperature of 110 to 135° C. and second polypropylene with a melt flow rate $MFR_2$ (230° C.) of 25 to 50 g/10 min and melting temperature of 135 to 165° C. There is no indication as to how very thin fibers can be obtained without filament breaking.

Thus the object of the present invention is to provide a polypropylene composition which enables to produce very thin melt blown fibers with the risk of filament breaking.

The finding of the present invention is that very thin fibers are obtainable in case the polypropylene withstands high stretching strength. A further finding of the present invention is that the polypropylene composition must comprise a polypropylene with a melt flow rate $MFR_2$ (230° C.) above 400 g/10 min and additionally a further polypropylene with rather low melt flow rate $MFR_2$ (230° C.), e.g. below 25 g/10 min. Preferably the polypropylene of low melt flow rate $MFR_2$ (230° C.) exhibits a strain hardening behaviour, like the high melt strength polypropylene.

Accordingly the present invention is directed to a polypropylene composition (PP-C) comprising
(a) a polypropylene (A) having
  (i) a melt flow rate $MFR_2$ (230° C.) measured according to ISO 1133 of at least 450 g/10 min and
  (ii) a molecular weight distribution (MWD) measured according to ISO 16014 of not more than 3.5,
(b) a polypropylene (B) having a melt flow rate $MFR_2$ (230° C.) measured according to ISO 1133 of equal or below 20 g/10 min, and
(c) optionally a polypropylene (C) having a melt flow rate $MFR_2$ (230° C.) measured according to ISO 1133 of at least 2 times higher than the melt flow rate $MFR_2$ of the polypropylene (B) and of at least 2 times lower than melt flow rate $MFR_2$ of the polypropylene (A).
wherein the composition (PP-C) has a melt flow rate $MFR_2$ (230° C.) measured according to ISO 1133 of at least 200 g/10 min.

Preferably the polypropylene composition (PP-C) comprises the polypropylene (A), the polypropylene (B) and optionally the polypropylene (C) as the only polymer components.

Accordingly in a preferred embodiment the composition may contain additives but no further other polymers as those mentioned in this paragraph and in further detail defined below.

It has been surprisingly found out that such a polypropylene composition (PP-C) has superior properties compared to known polypropylene compositions, in particular to those used for melt blown fiber processing. The polypropylene composition (PP-C) of the present invention enables in particular to reach a maximum applicable air volume during fiber processing compared to other polypropylenes, in particular to other metallocene produced polypropylenes. Thus with the inventive polypropylene composition (PP-C) very thin fibres are producible, which is not possible with known polypropylenes.

In the following the inventive polypropylene composition (PP-C) and its individual components is described in more detail.

Especially good results are achievable in case the polypropylene composition comprises a minimum amount of polypropylene (B). It has been discovered that already small amounts of the polypropylene (B) significantly improve the stretching strength of the polypropylene composition (PP-C) during the melt blown fiber processing. Accordingly it is preferred that the polypropylene composition comprises at least 0.5 wt.-% of the polypropylene (B). A further finding is that at a certain level of polypropylene (B) the stretching performance cannot further improved. Thus it is appreciated that the amount of polypropylene within the polypropylene composition (PP-C) does not exceed 30.0 wt.-%. Accordingly it is in particular preferred that the polypropylene composition (PP-C) of the present invention comprises
(a) 75.0 to 99.5 wt.-%, more preferably 80.0 to 95.0 wt.-%, like 82.0 to 93.0 wt.-%, of the polypropylene (A),
(b) 0.5 to 25.0 wt.-%, more preferably 1.0 to 20.0 wt.-%, like 1.5 to 12.0 wt.-%, of the polypropylene (B), and
(c) 0 to 15 wt.-%, more preferably 0.5 to 10.0 wt.-%, like 1.0 to 8.0 wt.-%, of the polypropylene (C),
based on the total composition, preferably based on the polypropylenes present in the composition, more preferably based on the polypropylene (A), the polypropylene (B) and the polypropylene (C) together.

Further it is preferred that the polypropylene (A) and the polypropylene (C) are unbranched, i.e. that the polymers have a branching index g' of 1.0. The branching index g' is in further detail described below.

Thus the polypropylene composition (PP-C) of the present invention may comprise further components. However it is preferred that the polypropylene composition (PP-C) comprises as polymer components only the polypropylenes (A), (B) and optionally (C) as defined in the instant invention. Accordingly the amounts of the polypropylenes (A), (B) and optionally (C) may not result in 100 wt.-% based on the total polypropylene composition (PP-C). Thus the remaining part up 100.0 wt.-% may be accomplished by further additives known in the art. However this remaining part shall be not more than 3.0 wt.-%, like not more 1.0 wt.-% within the total composition. For instance the inventive polypropylene composition (PP-C) may comprise additionally small amounts antioxidants stabilizers, fillers, colorants, nucleating agents and antistatic agents. In general, these are incorporated during granulation of the pulverulent product obtained in the polymerization. Accordingly the polypropylenes (A), (B) and optionally (C) constitutes at least to 97 wt.-%, more preferably at least 99 wt.-%, to the total polypropylene composition (PP-C). Primary and secondary antioxidants include, for example, hindered phenols, hindered amines, and phosphates. Nucleating agents include, for example, sodium benzoate, sorbitol derivatives like bis-(3,4-dimethylbenzylidene) sorbitol and nonitol derivatives like 1,2,3-trideoxy-4,6:5,7-bis-O[(4-propylphenyl)methylene]-nonitol. Other additives such as dispersing and antistatic agents like glycerol monostearate can also be included. Slip agents include, for example, oleamide and erucamide. Catalyst deactivators are also commonly used, for example, calcium stearate, hydrotalcite, and calcium oxide, and/or other acid neutralizers known in the art.

A further mandatory requirement of the propylene composition (PP-C) is its rather high melt flow rate, which differ(s) form other polymers used for instance in the spunbond technique to produce fibers. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the polypropylene composition (PP-C) has a melt flow rate $MFR_2$ (230° C.) of at least 200 g/10 min, more preferably of at least 250 g/10 min, still more preferably in the range of in a range of 200 to 3,000 g/10 min, yet more preferably in the range of 250 to 1,000 g/10 min.

Further it is appreciated that the polypropylene composition (PP-C) according to this invention has a melting temperature Tm measured according to ISO 11357-3 of least 149° C., more preferably at least 151° C., yet more preferably at least 153° C. Accordingly the melting temperature Tm ranges preferably from 149 to 164° C., more preferably ranges from 151 to 162° C.

Further the polypropylene composition (PP-C) can be additionally defined by the gel content. The gel content is a good indicator for the chemical modification of the polypropylene composition or its components. Accordingly the present invention is featured by relatively moderate gel content, i.e. of not more than 1.00 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the polypropylene composition (PP-C) achieves especially good results in case it comprises a certain amount of high melt strength polypropylene (HMS-PP) as polypropylene (B). Accordingly the amount of gel content in the polypropylene composition (PP-C) is preferably more than 0.10 wt.-%, more preferably of at least 0.20 wt.-%. Thus a preferred range for the gel content of the polypropylene composition is 0.05 to 0.80 wt.-%, like 0.10 to 0.70 wt.-%, more preferred 0.20 to 0.60 wt.-%.

Further it is appreciated that the polypropylene composition (PP-C) is free of any elastomeric polymer component, like an ethylene propylene rubber. In other words the polypropylene composition (PP-C) shall be not a heterophasic polypropylene composition, i.e. a system consisting of a polypropylene matrix in which an elastomeric phase is dispersed. Such systems are featured by a rather high xylene cold soluble content (XCS). Accordingly, the present polypropylene composition differs from such a heterophasic system by a rather low xylene cold soluble (XCS) content. Therefore the polypropylene composition has preferably a xylene cold soluble fraction (XCS) of not more than 12.0 wt-%, more preferably of not more than 10.0 wt.-%, yet more preferably of not more than 9.0 wt.-%, like not more than 8.5 wt.-%.

The polypropylene composition (PP-C) is in particular further defined by its individual components.

One mandatory requirement is the presence of a polypropylene with a rather high melt flow rate $MFR_2$ (230° C.). Accordingly the polypropylene composition (PP-C) shall comprise a polypropylene (A) having a melt flow rate $MFR_2$ (230° C.) measured according to ISO 1133 of at least 450 g/10 min, more preferably of at least 600 g/10 min, yet more preferably of at least 800 g/10 min, still more preferably in the range of 600 to 3,000 g/10 min, yet more preferably in the range of 750 to 2,000 g/10 min, still yet more preferably in the range of 850 to 1,500 g/10 min.

The polypropylene (A) is preferably produced in the presence of a single-site catalyst, e.g. a metallocene catalyst. Thus in a preferred embodiment the polypropylene is featured by a rather narrow molecular weight distribution (MWD). Accordingly the polypropylene (A) has a molecular weight distribution (MWD) measured by size exclusion chromatography (SEC) according to ISO 16014 of not more than 3.5, more preferably not more than 3.0 yet more preferably not more than 2.8, still more preferably in the range of 1.3 to 3.5, still yet more preferably in the range of 1.5 to 2.8.

The weight average molecular weight (Mw) is the first moment of a plot of the weight of polymer in each molecular weight range against molecular weight. The weight average molecular weight (Mw) is very sensitive to changes in number of large molecules in a given sample of a polymer. Thus it is preferred that the weight average molecular weight (Mw) measured by SEC according to ISO 16014 of the polypropylene (A) is below 85,000 g/mol, more preferably below 90,000 g/mol yet more preferably below 80,000 g/mol. On the other hand the weight average molecular weight (Mw) of the polypropylene (A) should be not too low. Thus it is especially preferred that the weight average molecular weight (Mw) measured according to ISO 16014 of the polypropylene (A) is in the range of 20,000 g/mol to 95,000 g/mol, more preferably in the range of 30,000 to 90,000 g/mol, yet more preferably in the range of 40,000 to 85,000 g/mol.

A further characteristic of the polypropylene (A) is its low xylene cold soluble content (XCS). Low amounts of xylene solubles are also an indicator that the polypropylene (A) has been obtained in a polymerization process in which a single site catalyst has been employed. Thus it is preferred that the xylene cold soluble content (XCS) measured according ISO 6427 (23° C.) of the polypropylene (A) is not more than 2.5 wt.-%, more preferably not more than 2.0 wt.-%, yet more preferably not more than 1.5 wt.-%, yet more preferably not more than 1.0 wt.-%, still yet more preferably not more than 0.8 wt.-%, like 0.3 to 1.5 wt.-% or 0.3 to 1.0 wt.-%.

The polypropylene (A) can be a propylene homopolymer (H-A) and/or a random propylene copolymer (R-A). Preferably the polypropylene (A) is a propylene homopolymer (H-PP).

The expression propylene homopolymer as used throughout the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable. The comonomer content can be determined with FT infrared spectroscopy, as described below in the examples.

The propylene homopolymer (H-A) is preferably an isotactic propylene homopolymer. Accordingly it is appreciated that the polypropylene matrix (H-A) has a rather high isotactic pentad concentration, i.e. higher than 90 mol-%, more preferably higher than 92 mol-%, still more preferably higher than 93 mol-% and yet more preferably higher than 95 mol-%, like higher than 97 mol-%.

Preferably the propylene homopolymer (H-A) has a melting temperature Tm measured according to ISO 11357-3 of at least 150° C., more preferably of at least 152° C., like of at least 153° C. Accordingly the melting temperature ranges preferably from 150 to 164° C., more preferably ranges from 151 to 158° C.

The random propylene copolymer (R-A) preferably comprises, preferably consist of, units derived from
(i) propylene and
(ii) ethylene and/or at least one $C_4$ to $C_{20}$ α-olefin, preferably at least one α-olefin selected from the group consisting of ethylene, 1-butene, 1-pentene, 1-hexene and 1-octene, more preferably ethylene and/or 1-butene, yet more preferably ethylene.

Accordingly the random propylene copolymer (R-A) may comprise units derived from propylene, ethylene and optionally at least another $C_4$ to $C_{10}$ α-olefin. In one specific aspect of the present invention the random propylene copolymer (R-A) comprises units derived from propylene, ethylene and optionally at least another α-olefin selected from the group consisting of $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the random propylene copolymer (R-A) comprises units derived from propylene, ethylene and optionally at least another α-olefin selected from the group consisting of 1-butene, 1-pentene, 1-hexene, 1-heptene, 1-octene, 1-nonene and 1-decene, wherein 1-butene and 1-hexene are preferred. It is in particular preferred that the random propylene copolymer (R-A) consists of units derived from propylene and ethylene. Preferably the units derivable from propylene constitutes the main part of the random propylene copolymer (R-A), i.e. at least 95.0 wt.-%, preferably of at least 97.0 wt.-%, more preferably of at least 98.0 wt.-%, still more preferably of 95.0 to 99.5 wt.-%, yet more preferably of 97.0 to 99.5 wt.-%, still more preferably of 98.0 to 99.2 wt.-%. The amount of units derived from $C_2$ to $C_{20}$ α-olefins other than propylene in the random propylene copolymer (R-A), is in the range of 0.5 to 5.0 wt.-%, more preferably 0.5 to 3.0 wt.-%, still more preferably 0.8 to 2.0 wt.-%. It is in particular appreciated that the amount of ethylene in the random propylene copolymer (R-A), in particular in case the random propylene copolymer (R-A) comprises only units derivable from propylene and ethylene, is in the range of 0.5 to 5.0 wt.-%, preferably of 0.8 to 2.0 wt.-%.

Preferably random propylene copolymer (R-A) is isotactic. Accordingly it is appreciated that the random propylene copolymer (R-A) has a rather high pentad concentration, i.e. higher than 95 mol-%, more preferably higher than 97 mol-%, still more preferably higher than 98 mol-%.

Further the units derived from $C_2$ to $C_{20}$ α-olefins other than propylene within the random propylene copolymer (R-A) are randomly distributed. The randomness indicates the amount of isolated comonomer units, i.e. those which have no other comonomer units in the neighbourhood, compared to the total amount of comonomers in the polymer chain. In a preferred embodiment, the randomness of the random propylene copolymer (R-A) is at least 30%, more preferably at least 50%, even more preferably at least 60%, and still more preferably at least 65%.

Additionally it is appreciated that the random propylene copolymer (R-A) has a melting temperature Tm measured according to ISO 11357-3 of least 140° C., preferably at least 145° C., more preferably at least 150° C. Accordingly the melting temperature ranges preferably from 140 to 164° C., more preferably ranges from 150 to 160° C.

One possibility to obtain the polypropylene having such high melt flow rates and a rather narrow molecular weight distribution (MWD) as indicated above is visbreaking. However in the present case it is preferred to produce the polypropylene (A) without visbreaking, i.e. using in the polymerization of the polypropylene (A) a single site catalyst. One advantage of such polymer material is that no peroxide is needed for the degradation. The exact description as to how the polypropylene can be obtained is given below.

As further mandatory component within the polypropylene composition (PP-C) the polypropylene (B) must be present. Contrary to the polypropylene (A) the polypropylene (B) must have a rather low melt flow rate $MFR_2$ (230° C.). Accordingly it is appreciated that the polypropylene (B) has a melt flow rate $MFR_2$ (230° C.) measured according to ISO 1133 of equal or below 20 g/10 min, more preferably equal or below 15 g/10 min, yet more preferably equal or below 10 g/10 min, still more preferably in the range of 1.0 to 20.0 g/10 min, still yet more preferably in the range of 2.0 to 15.0 g/10 min, like in the range of 3.0 to 10.0 g/10 min.

Especially good results are achievable in case the ratio of the melt flow rate of the polypropylene (A) and polypropylene (B) [$MFR_2$ (A)/$MFR_2$ (B)] is in the range of 100 to 300, like 110 to 280, wherein the melt flow rates $MFR_2$ (230° C.) are measured according to ISO 1133.

The polypropylene (B) is preferably a propylene homopolymer (H-PP) or a high melt strength polypropylene (HMS-PP), the latter being especially preferred.

In case the polypropylene is a propylene homopolymer (H-PP), said propylene homopolymer (H-PP) preferably has a xylene cold soluble content (XCS) measured according ISO 6427 (23° C.) of equal or more than 0.5 wt.-%, yet more preferably in the range of 0.5 to 3.5 wt.-%, like 0.6 to 3.0 wt.-%.

Thus different to the polypropylene (A) the polypropylene (B) is, i.e. the propylene homopolymer (H-PP) and the high melt strength polypropylene (HMS-PP) are, producible, preferably is/are produced in the presence of a Ziegler-Natta catalyst.

Accordingly it is in particular appreciated that the propylene homopolymer (H-PP) has <1,2> regiodefects of not more than 0.4 mol.-%, more preferably of not more than 0.2 mol.-%, like of not more than 0.1 mol.-%, determined by $^{13}$C-NMR.

The exact process to obtain the propylene homopolymer (H-PP) is given below.

As mentioned above in a preferred embodiment the polypropylene (B) is a high melt strength polypropylene (HMS-PP).

Such polymer types are characterized by a certain degree of branching. Possible high melt strength polypropylenes (HMS-PP) are so called Y/H-polypropylenes and for instance described in EP 0 787 750, i.e. single branched polypropylene types (Y polypropylenes having a backbone with a single long side-chain and an architecture resembles a "Y") and polypropylene types in which polymer chains are coupled with a bridging group (an architecture resembles a "H"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$, in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17,1301 (1949). This document is herewith included by reference. Thus it is preferred that the branching index g' of the high melt strength polypropylene (HMS-PP) shall be less than 1.0, more preferably equal or less than 0.9, like less than 0.8. In another preferred embodiment the branching index g' of the high melt strength polypropylene (HMS-PP) shall be preferably less than 0.75.

The high degree of branching of the high melt strength polypropylene (HMS-PP) contributes also to its melt strength. Accordingly it is preferred that the high melt strength polypropylene (HMS-PP) is further characterized by a strain hardening behaviour with a haul-off force $F_{max}$ of at least 7.0 cN and a draw down velocity $v_{max}$ of at least 200 mm/s, more preferably by a strain hardening behaviour with a haul-off force $F_{max}$ of at least 20.0 cN and a draw down velocity $v_{max}$ of at least 250 mm/s, yet more preferably by a strain hardening behaviour with a haul-off force $F_{max}$ of at least 10.0 cN and a draw down velocity $v_{max}$ of at least 245 mm/s.

Such a high melt strength polypropylene (HMS-PP) is preferably obtained by modifying, i.e. chemically modifying, a polypropylene. Such a modification is necessary to achieve the branching structure and/or the strain hardening phenomena of the high melt strength polypropylene (HMS-PP). Such a modification has also influence on the gel content of the high melt strength polypropylene (HMS-PP). Accordingly it is justified to define the high melt strength polypropylene (HMS-PP) further and/or alternatively by its gel content. Thus it is appreciated that the high melt strength polypropylene (HMS-PP) is featured by a relatively moderate gel content, i.e. of below 1.0 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the high melt strength polypropylene (HMS-PP) may show a certain degree of branching and thus a certain amount of gel content, i.e. of at least 0.15 wt.-%, more preferably of at least 0.27 wt.-%. Thus a preferred range for the gel content of the high melt strength polypropylene (HMS-PP) is 0.05 to 0.90 wt.-%, more preferred 0.26 to 0.8 wt.-%.

Additionally it is preferred that in the melt strength polypropylene (HMS-PP) has a melt flow rate $MFR_2$ (230° C.) measured according to ISO 1133 in a range of 1.0 to 20.0 g/10 min, more preferably in a range of 2.0 to 15.0 g/10 min, still more preferably in a range of 3.0 to 10.0 g/10 min.

Preferably, the high melt strength polypropylene (HMS-PP) has a density measured according ISO 1183-187 of at least 850 kg/m$^3$, more preferably of at least 875 kg/m$^3$ and most preferably of at least 900 kg/m$^3$.

Further, preferably, the high melt strength polypropylene (HMS-PP) has a density measured according ISO 1183-187 of not more than 950 kg/m$^3$, more preferably of not more than 925 kg/m$^3$ and most preferably of not more than 910 kg/m$^3$.

Preferably, the high melt strength polypropylene (HMS-PP) has a melting point of at least 140° C., more preferably of at least 150° C. and most preferably of at least 160° C.

As stated above, the melt strength polypropylene (HMS-PP) is preferably a modified polypropylene. Accordingly the melt strength polypropylene (HMS-PP) can be further defined by the way obtained. Thus the melt strength polypropylene (HMS-PP) is preferably the result of treating an unmodified polypropylene (D) with thermally decomposing radical-forming agents and/or with ionizing radiation. However in such a case a high risk exists that the polypropylene (D) is degraded, which is detrimental. Thus it is preferred that the modification is accomplished by the use of bifunctionally unsaturated monomer(s) and/or multifunctionally unsaturated low molecular weight polymer(s) as chemically bound bridging unit(s). A suitable method to obtain the melt strength polypropylene (HMS-PP) is for instance disclosed in EP 0 787 750, EP 0 879 830 A1 and EP 0 890 612 A2. All documents are herewith included by reference. Thereby, the amount of peroxide is preferably in the range of 0.05 to 3.00 wt.-% based on the unmodified polypropylene (D).

Accordingly in one preferred embodiment the high melt strength polypropylene (HMS-PP) comprises units derived from
(i) propylene and
(ii) bifunctionally unsaturated monomer(s) and/or multifunctionally unsaturated low molecular weight polymer(s).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the polypropylene (D).

Reaction of the bifunctionally unsaturated monomer(s) and/or multifunctionally unsaturated low molecular weight polymer(s), preferably having a number average molecular weight ($M_n$)≤10000 g/mol, synthesized from one and/or more unsaturated monomers with the propylene polymer composition may be performed in the presence of a thermally free radical forming agent, e.g. decomposing free radical-forming agent, like a thermally decomposable peroxide and/or ionizing radiation or microwave radiation.

The bifunctionally unsaturated monomers may be
divinyl compounds, such as divinylaniline, m-divinylbenzene, p-divinylbenzene, divinylpentane and divinylpropane;

allyl compounds, such as allyl acrylate, allyl methacrylate, allyl methyl maleate and allyl vinyl ether;

dienes, such as 1,3-butadiene, chloroprene, cyclohexadiene, cyclopentadiene, 2,3-dimethylbutadiene, heptadiene, hexadiene, isoprene and 1,4-pentadiene;

aromatic and/or aliphatic bis(maleimide) bis(citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight $(M_n) \leq 10000$ g/mol may be synthesized from one or more unsaturated monomers.

Examples of such low molecular weight polymers are polybutadienes, especially where the different microstructures in the polymer chain, i.e. 1,4-cis, 1,4-trans and 1,2-(vinyl) are predominantly in the 1,2-(vinyl) configuration copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The high melt strength polypropylene (HMS-PP) may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength polypropylene (HMS-PP) is 0.01 to 10.0 wt.-% based on said high melt strength polypropylene (HMS-PP).

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Or mixtures of these above listed free radical-forming agents.

The unmodified polypropylene (D) to prepare such a high melt strength polypropylene (HMS-PP) has preferably a melt flow rate MFR$_2$ (230° C.) measured according to ISO 1133 in a range of 0.05 to 45.00 g/10 min. More preferably the melt flow rate MFR$_2$ (230° C.) measured according to ISO 1133 is in a range of 0.05 to 35.00 g/10 min in case the unmodified polypropylene (D) is a homopolymer. On the other hand the melt flow rate MFR$_2$ (230° C.) measured according to ISO 1133 is in a range of 0.05 to 45.00 g/10 min in case the unmodified polypropylene (D) is a copolymer.

Preferably the unmodified polypropylene (D) is a homopolymer.

To further improve the properties of the polypropylene composition (PP-C) according to this invention, it may additionally comprise a polypropylene (C) having a melt flow rate MFR$_2$ (230° C.) measured according to ISO 1133 in the range of 50 to 250 g/10 min, more preferably in the range of 60 to 150 g/10 min. The melting temperature Tm is preferably at least 158° C., more preferably at least 160° C., still more preferably in the range of 158 to 168° C., yet more preferably in the range of 160 to 166° C. Typically the molecular weight distribution (MWD) of the polypropylene (C) is higher compared to the molecular weight distribution (MWD) of the polypropylene (A). Accordingly the molecular weight distribution (MWD) of the polypropylene (C) is preferably at least more than 3.5, more preferably at least 4.0, yet more preferably in the range of more than 3.5 to 6.5, like 4.0 to 6.0.

The polypropylene (C) is preferably either a random propylene copolymer or a propylene homopolymer, the latter being preferred. Typically such polypropylene (C) is produced in the presence of a Ziegler-Natta catalyst.

Further the present invention is also directed to melt blown fibers made from the polypropylene composition (A) as defined above. Thus the present invention is in particular directed to a melt blown fiber having an average diameter of not more than 5.0 μm, said fiber comprises, preferably comprises at least of 95 wt.-% of, more preferably consists of, a polypropylene composition (PP-C) as defined above.

As stated above, one essential requirement of the inventive fiber is that it is a melt blown fiber. Melt blown fibers differ essentially from other fibers, in particular from those produced by spunbond technique. In the melt blowing process a gas stream of high velocity impinges on the molten polymer stream as the polymer extrudes from small capillary in the melt blowing die and rapidly attenuates the polymer filament from about 500 μm diameter at the capillary down to diameters below 5.0 μm, like down to diameters below 3.0 μm. This corresponds to a reduction of 500 times in fiber diameter and 2,500,000 times in cross sectional area. The process occurs in about 200 microseconds over a distance of a few centimetres. This amounts to 6 times more surface area and 36 times more fiber in a melt blown web of 1 to 3 μm compared to an equivalent fiber web produced by carded or spunbond technique. Thus the principal advantage of the melt blown process is that one can make very fine fibers and very lightweight melt blown webs with excellent uniformity. The result is a soft melt blown web with excellent barrier properties, meaning effective filtration characteristics and resistance to penetration by aqueous liquids. In other words the process features "melt blown" distinguishes such produced fibers from fibers produced by different technology. More precisely "melt blown fibers" are very thin having diameters not accomplished with other fiber processes. Further webs made out of such melt blown fibers are softer and have lower weight compared to webs of the same thickness but produced by other technologies, like the spunbond process.

Accordingly the melt blown fiber according to the present invention preferably has an (average) diameter measured of not more than 5.0 µm, more preferably of not more than 3.5 µm. It is in particular appreciated that the (average) diameter of the melt blown fiber is in the range of 0.1 to 5.0 µm, more preferably in the range of 0.5 to 5.0 µm, yet more preferably in the range of 0.5 to 3.5 µm, like 0.7 to 3.0 µm.

The present invention is not only directed to the melt blown fibers as such but also to articles, like webs, made thereof. Accordingly the present invention is directed to articles comprising the melt blown fibers of the present invention, like filtration medium (filter), diaper, sanitary napkin, panty liner, incontinence product for adults, protective clothing, surgical drape, surgical gown, and surgical wear. In particular the present invention is directed to a melt blown web comprising melt blown fibers of the instant invention.

Further the present invention claims articles selected from the group consisting of filtration medium (filter), diaper, sanitary napkin, panty liner, incontinence product for adults, protective clothing, surgical drape, surgical gown, and surgical wear, comprising a melt blown web comprising the melt blown fibers of the present invention. The articles of the present invention may comprise in addition to the melt blown web a spunbonded fabric known in the art.

The present invention is also directed to the use of a polypropylene (B) having a melt flow rate $MFR_2$ (230° C.) measured according to ISO 1133 of equal or below 20 g/10 min in a polypropylene composition (PP-C2) having a melt flow rate $MFR_2$ (230° C.) measured according to ISO 1133 of at least 200 g/10 min to improve the stretching strength of said polypropylene composition (PP-C2) expressed by the maximum applicable air volume during the melt blown fiber processing, wherein the improvement is defined by the formula (V), preferably defined by formula (VI), $$PP\text{-}2/PP\text{-}1 \geq 1.3 \quad (V),$$

$$PP\text{-}2/PP\text{-}1 \geq 1.4 \quad (VI)$$

wherein
PP-2 is the maximum applicable air volume [m³/h] of the composition (PP-C2) comprising the polypropylene (B),
PP-1 is the maximum applicable air volume [m³/h] of the composition (PP-C2) without the polypropylene (B).

Preferably the maximum applicable air volume [m³/h] is determined by a die to collector distance (DCD) of 180 mm, a basis weight of 120 g/m² and a melt temperature of 275° C.

Preferably the composition (PP-C2) comprises apart from the polypropylene (B) a polypropylene (A), wherein the polypropylene (A) has
(i) a melt flow rate $MFR_2$ (230° C.) measured according to ISO 1133 of at least 450 g/10 min
And/or
(ii) a molecular weight distribution (MWD) measured according to ISO 16014 of not more than 3.5.

It is especially preferred that the polypropylene (B) used in the polypropylene composition (PP-C2) is the polypropylene (B) as defined for the polypropylene composition (PP-C).

Further it is preferred that the polypropylene composition (PP-C2) is the polypropylene composition (PP-C) as defined above. Finally in a, especially preferred embodiment the polypropylene (A) is the one as defined for the polypropylene composition (PP-C).

The individual components used for the inventive polypropylene composition can be readily produced by the information provided in the following.

Preferably the polypropylene (A) is produced in the presence of a single-site catalyst, in particular in the presence of a metallocene catalyst, like a metallocene catalyst of formula (I)

$$(Cp)_2R_zMX_2 \quad (I)$$

wherein
z is 0 or 1, preferably 1,
M is a Group 4, 5, or 6 transition metal of the Periodic Table, for example titanium (Ti), zirconium (Zr), hafnium (Hf), vanadium (V), niobium (Nb), tantalum (Ta), chromium (Cr), molybdenum (Mo) and tungsten (W), especially zirconium (Zr),
X is independently a monovalent anionic ligand, such as σ-ligand,
Cp is an organic ligand selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl,
preferably with the proviso that both Cp-ligands are selected from the above stated group and both Cp-ligands are chemically the same, i.e. are identical
R is a bridging group linking the two Cp ligands, wherein R has the formula (II)

$$-Y(R')_2- \quad (II)$$

wherein
Y is C, Si or Ge, preferably Si,
R' is $C_1$ to $C_{20}$ alkyl, $C_6$-$C_{12}$ aryl, $C_7$-$C_{12}$ arylalkyl, or trimethylsilyl, preferably with the proviso that both R'-residues are selected from the above stated group and both R'-residues are chemically different.

Even more preferred the polypropylene (A) is in particular obtainable, more preferably obtained, by a catalyst system comprising the metallocene of formula (I), said catalyst system has a surface area measured according to ISO 9277 of below 20 m²/g.

Due to the use of the catalyst system with a very low surface area comprising the specific metallocene of formula (I) the manufacture of the above defined polypropylene (A) is possible.

Furthermore it is preferred, that the catalyst system has a surface area of lower than 15 m²/g, yet still lower than 10 m²/g and most preferred lower than 5 m²/g. The surface area according to this invention is measured according to ISO 9277 ($N_2$).

Additionally it is appreciated that the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is not detectable when determined with the method applied according to DIN 66135 ($N_2$).

It is in particular preferred that the porosity is not detectable when applying the method according to DIN 66135 ($N_2$) and the catalyst system has a surface area measured according to ISO 9277 ($N_2$) of less than 5 m²/g The term "σ-ligand" is understood in the whole description in a known manner, i.e. a group bonded to the metal at one or more places via a sigma bond. A preferred monovalent anionic ligand is halogen, in particular chlorine (Cl).

Preferably, in the metallocene of formula (I) each X is chlorine (Cl) and/or both Cp-ligands, especially both identical Cp-ligands, are substituted.

The optional one or more substituent(s) bonded to cyclopentadienyl, indenyl, tetrahydroindenyl, or fluorenyl may be selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ and —NR"$_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands, preferably both identical Cp-ligands, are indenyl moieties wherein each indenyl moiety bear one or two substituents as defined above. More preferably each of the (identical) Cp-ligands is an indenyl moiety bearing two substituents as defined above, preferably with the proviso that the substituents are chosen in such are manner that both Cp-ligands are of the same chemical structure, i.e. both Cp-ligands have the same substituents bonded to chemically the same indenyl moiety.

Still more preferably both Cp-ligands, preferably both identical Cp-ligands, are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, preferably with proviso that the indenyl moieties of both Cp-ligands are of the same chemical structure, i.e. both Cp-ligands have the same substituents bonded to chemically the same indenyl moiety.

Still more preferred both Cp-ligands, preferably both identical Cp-ligands, are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety, preferably with proviso that the indenyl moieties of both Cp-ligands are of the same chemical structure, i.e. both Cp-ligands have the same substituents bonded to chemically the same indenyl moiety.

Yet more preferably both Cp-ligands, preferably both identical Cp-ligands, are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, preferably is methyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, like tert-butyl, and a heteroaromatic ring moiety, preferably with proviso that the indenyl moieties of both Cp-ligands are of the same chemical structure, i.e. both Cp-ligands have the same substituents bonded to chemically the same indenyl moiety.

It is in particular appreciated that both Cp-ligands, preferably both identical Cp-ligands, are indenyl moieties wherein the indenyl moieties comprise at the five membered ring of the indenyl moiety at the 2-position a substituent and at the six membered ring of the indenyl moiety at the 4-position a further substituent, wherein the substituent of the five membered ring is selected from the group consisting of methyl, ethyl and isopropyl, and the further substituent of the six membered ring is selected from the group consisting of phenyl, $C_1$-$C_6$ alkyl substituted phenyl, like 4-tert-butyl-phenyl, naphthyl, and $C_1$-$C_6$ alkyl substituted naphthyl, preferably with proviso that the indenyl moieties of both Cp-ligands are of the same chemical structure, i.e. both Cp-ligands have the same substituents bonded to chemically the same indenyl moiety.

Concerning the linking group "R" of formula (II)

—Y(R')$_2$—  (II)

it is preferred that
Y is Si
R' is $C_1$ to $C_{10}$ alkyl or $C_6$-$C_{12}$ aryl,
Preferably with the proviso that both R'-residues are selected from the above stated group and both R'-residues are chemically different.

Accordingly in a specific embodiment the catalyst is of formula (III)

(Cp)$_2$RZrCl$_2$  (III)

wherein
Cp is a substituted indenyl with a substituent at the 2-position of the five membered ring and a substituent at the 4-position of the six membered ring, wherein the substituent of the five membered ring is methyl or ethyl and the substituent of the six membered ring is $C_1$-$C_6$ alkyl substituted phenyl, like 4-methyl-phenyl or 4-tert-butyl-phenyl (the latter especially preferred),
with the proviso that both Cp-ligands are chemically the same, i.e. are identical,
R is a bridging group linking the two Cp ligands, wherein R has the formula (IV)

—Si(R')$_2$—  (IV)

wherein
R' is selected from the group consisting of methyl, ethyl, iso-propyl, cyclo-hexyl, 4-$C_1$ to $C_{10}$ alkyl cyclo-hexyl, like 4-methyl-cyclo-hexyl,
Preferably with the proviso that both R'-residues are selected from the above stated group and both R'-residues are chemically different.

In an especially preferred embodiment the catalyst is methylcyclohexylsilandiylbis(2-methyl-4-tert-butyl-phenyl-indenyl)zirkonium dichloride.

Further it is preferred that the used catalyst systems are self-supported, i.e. they are solid, but do not comprise catalytically inert external carrier material, such as organic and inorganic support materials, like silica, MgCl$_2$ or (porous) polymeric carrier material.

The above described catalyst system is prepared according to the methods described in WO 01/48034.

It is in particular preferred that the catalyst system is obtainable by the emulsion solidification technology as described in WO 03/051934. This document is herewith included in its entirety by reference. Hence the catalyst system is preferably in the form of solid catalyst particles, obtainable by a process comprising the steps of
a) preparing a solution of one or more catalyst components;
b) dispersing said solution in a solvent immiscible therewith to form an emulsion in which said one or more catalyst components are present in the droplets of the dispersed phase,
c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro(methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 m$^2$/g, still more preferably less than 20 m$^2$/g, yet more preferably less than 15 m$^2$/g, yet still more preferably less than 10 m$^2$/g and most preferably less than 5 m$^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

The above described catalyst components are prepared according to the methods described in WO 01/48034.

As mentioned above the catalyst system may further comprise an activator as a cocatalyst, as described in WO 03/051934, which is enclosed herein with reference.

Preferred as cocatalysts for metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other caption complex forming catalysts activators can be used. Said activators are commercially available or can be prepared according to the prior art literature.

Further aluminoxane cocatalysts are described i.e. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

The polymerization of the polypropylene (A) can be a bulk polymerization, preferably performed in a so-called loop reactor. Alternatively the polymerization of the polypropylene (A) is a two stage polymerization performed in a combination of a loop reactor operating in slurry phase and a gas phase reactor as for instance applied in the Borstar polypropylene process.

Preferably, in the process for producing the polypropylene (A) as defined above the conditions for the bulk reactor of step may be as follows:
  the temperature is within the range of 40° C. to 110° C., preferably between 60° C. and 100° C., 70 to 90° C.,
  the pressure is within the range of 20 bar to 80 bar, preferably between 30 bar to 60 bar,
  hydrogen can be added for controlling the molar mass in a manner known per se.

Subsequently, the reaction mixture from the bulk (bulk) reactor is transferred to the gas phase reactor, whereby the conditions are preferably as follows:
  the temperature is within the range of 50° C. to 130° C., preferably between 60° C. and 100° C.,
  the pressure is within the range of 5 bar to 50 bar, preferably between 15 bar to 35 bar, hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

The propylene homopolymer (H-PP), as one of the two options for the polypropylene (B), as well as the polypropylene (C) are obtainable with a process using a Ziegler-Natta system. The propylene homopolymer (H-PP) or the polypropylene (C) may be prepared by polymerizing, in a slurry reactor, for example a loop reactor, propylene in the presence of a polymerization catalyst to produce at least a part of the propylene homopolymer (H-PP) or the polypropylene (C). In case only a part of the propylene homopolymer (H-PP) or part of the polypropylene (C) is produced, this part is then subsequently transferred to a gas phase reactor, wherein in the gas phase reactor propylene is reacted in order to produce a further part in the presence of the reaction product of the first step. This reaction sequence provides a reactor blend of parts (i) and (ii) constituting the propylene homopolymer (H-PP) or the polypropylene (C). It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, hydrogen feed, temperature and pressure in order to suitably adjust the properties of the polymerization products obtained. It is in particular possible to obtain a multimodality, preferably the bimodality, of the propylene homopolymer (H-PP) with respect to the molecular weights and $MFR_2$ (230° C.) values during said multistage polymerization procedures. However the propylene homopolymer (H-PP) or the polypropylene (C) can be also produced in one reactor, like a loop reactor, a method which is preferred.

Such a process (one reactor or more reactors in sequence) can be carried out using any suitable catalyst for the preparation of the propylene homopolymer (H-PP) or the polypropylene (C). Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane or cyclohexyl methyldimethoxy silane. One embodiment of a process for the propylene homopolymer (H-PP) or the polypropylene (C), as discussed above, is a loop phase process or a loop-gas phase process, such as developed by Borealis, known as Borstar® technology, described for example in EP 0 887 379 A1 and WO 92/12182.

With respect to the above-mentioned preferred loop (slurry) phase process or preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor (in case of a slurry-gas-phase process), wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the propylene homopolymer (H-PP) or the polypropylene (C) produced with the above-outlined process may be adjusted and controlled with the process conditions as known to the skilled person, for example by one or more of the following process parameters: temperature, hydrogen feed, propylene feed, catalyst, type and amount of external donor, split between two or more components of a multimodal polymer.

The high melt strength polypropylene (HMS-PP), as one of the two options for the polypropylene (B), is preferably obtained by a process as described in EP 0 879 830 A1 and EP 0 890 612 A2. Both documents are herewith included by reference. Accordingly the high melt strength polypropylene (HMS-PP) is produced by (a) mixing
 (i) a unmodified propylene homopolymer and/or copolymer (D) as defined above, preferably a unmodified propylene homopolymer (D) with a weight average molecular weight ($M_w$) of 500,000 to 1,500,000 g/mol,
 (ii) from 0.05 to 3 wt.-% based on the components of (i) and (ii), of a peroxide selected from the group consisting of acyl peroxide, alkyl peroxide, hydroperoxide, perester and peroxycarbonate, and
 (iii) optionally diluted with inert solvents,
(b) heating to 30 to 100° C., preferably to 60 to 90° C.,
(c) sorption of volatile bifunctional monomers, preferably ethylenically unsaturated, multifunctional monomers, like $C_4$ to $C_{10}$ dienes and/or $C_7$ to $C_{10}$ divinyl compounds, by the unmodified propylene homopolymer and/or copolymer (D), preferably unmodified propylene homopolymer (D), from the gas phase at a temperature of from 20 to 120° C., preferably of from 60 to 100° C., where the amount of the absorbed bifunctionally unsaturated monomers is from 0.01 to 10.00 wt.-%, preferably from 0.05 to 2.00 wt.-%, based on the propylene homopolymer (D),
(d) heating and melting the polypropylene composition in an atmosphere comprising inert gas and/or the volatile bifunctional monomers, from sorption temperature to 210° C., whereupon the free-radical generators are decomposed and then (e) heating the melt up to 280° C. in order to remove unreacted monomers and decomposition products, and
(f) agglomerating the melt.

The process for producing the high melt strength polypropylene (HMS-PP) preferably is a continuous method, performed in continuous reactors, mixers, kneaders and extruders. Batchwise production of the high melt strength polypropylene (HMS-PP), however is feasible as well.

Practical sorption times τ of the volatile bifunctional monomers range from 10 to 1000 s, where sorption times τ of 60 to 600 are preferred.

The process of the invention or any embodiments thereof above enable highly feasible means for producing and further tailoring the propylene polymer composition within the invention, e.g. the properties of the polymer composition can be adjusted or controlled in a known manner e.g. with one or more of the following process parameters: temperature, hydrogen feed, comonomer feed, propylene feed e.g. in the gas phase reactor, catalyst, the type and amount of an external donor (if used), split between components.

The above process enables very feasible means for obtaining the reactor-made polypropylene as defined above Further, the polypropylene composition (PP-C) in accordance with the present invention may be prepared by compounding the components within suitable melt mixing devices for preparing polymeric compounds, including in particular extruders single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the compositions are in the range from 170 to 300° C., preferably in the range from 200 to 260° C. and a screw speed of 50 to 300 rpm.

The thus obtained polypropylene composition (PP-C) is used in pellet or granule form for the melt blown fiber process. In the process metering pumps are used to pump the molten polypropylene composition (PP-C) to a distribution system having a series of die tips, the polypropylene composition (PP-C) being in the molten state at some processing temperature. The die tip is designed in such a way that the holes are in a straight line with high-velocity air impinging from each side. A typical die will have 0.3 to 0.5 mm diameter, preferably 0.4 mm diameter, holes spaced at 10 to 16 per cm (25 to 40 per inch). The impinging high-velocity hot air attenuates the filaments and forms the desired fibers. Immediately below or adjacent to the die, a large amount of ambient air is drawn into the hot air stream containing the fibers which cools the hot gas and solidifies the fibers onto a forming belt or other solid surface that is typically moving in such a manner as to create a continually renewed surface for the fibers to contact and form a web. The processing temperature is one factor in the final web properties. The "optimal" processing temperature is one at which ideal properties of the web are achieved such as low shot with good hand and high barrier properties, or good filtration properties.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Isotacticity in Polypropylene by $^{13}$C NMR Spectroscopy

The isotacticity is determined by quantitative $^{13}$C nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g. in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i.e. mmmm fraction of the pentad distribution.

2,1-propylene Insertions

The relative amount of 2,1-insertions of propylene monomers in the chain was determined by $^{13}$C-NMR spectroscopy and calculated as described in EP 0 629 632 B1.

Randomness

In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure —P-E-P— (one ethylene unit between propylene units), occurs at 733 cm$^{-1}$. This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C-NMR. (Thermochimica Acta, 66 (1990) 53-68).

Randomness=random ethylene (—P-E-P—) content/ the total ethylene content×100%.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Density is measured according to ISO 1183-187. Sample preparation is done by compression molding in accordance with ISO 1872-2:2007

$MFR_2$ (230° C.) is measured according to ISO 1133 (230° C., 2.16 kg load).

Quantification of Comonomer Content by FTIR Spectroscopy

Quantitative infrared (IR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature. The amount of comonomer (N) was determined as weight percent (wt %) via:

$N = k1(A/R) + k2$ where A is the maximum absorbance defined of the comonomer band, R the maximum absorbance defined as peak height of the reference peak and with k1 and k2 the linear constants obtained by calibration.

For poly(ethylene-co-propene-co-butene) (EPB) systems quantification was achieved via two characteristic absorbance bands:

1-butene content via 760 cm$^{-1}$ (linear baseline correction between 750 to 810 cm$^{-1}$)

ethylene content via 720 or 730 cm$^{-1}$ (linear baseline correction between 710 to 750 cm$^{-1}$)

The band used for ethane content quantification is selected depending if the ethylene content is random (730 cm$^{-1}$) or block-like (720 cm$^{-1}$). The absorbance at 4324 cm$^{-1}$ was used as a reference band.

The amount of comonomer (N) as determined as mole percent (mol %) was obtained by conversion from units of weight percent (wt %) through use of the molecular weight (Mw) of the comonomer:

$$NA[\text{mol \%}] = (NA[\text{wt \%}]/MwA)/((NA[\text{wt \%}]/MwA) + (NB[\text{wt \%}]/MwB) + ((100[\text{wt \%}] - NA[\text{wt \%}] - NB[\text{wt \%}])/MwC))$$

Solid-state infrared spectra were recorded using a FTIR spectrometer on compression molded thin (100-800 μm) films at a resolution of 4 cm$^{-1}$ and analysed in transmission mode.

Quantification of Comonomer Content by $^{13}$C NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g. "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

Melting Temperature Tm

Melting temperature (peak temperature) Tm was measured by DSC according to ISO 11357-3 using the peak temperature in the second heat in a heat—cool—heat cycle with a rate of 10 K/min between ambient temperature and 210° C.

The Xylene Solubles (XCS, wt.-%):

Content of Xylene solubles (XCS) is determined at 23° C. according ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Strain Hardening Behaviour (Melt Strength):

The strain hardening behaviour is determined by the method as described in the article "Rheotens-Mastercurves and Drawability of Polymer Melts", M. H. Wagner, Polymer Engineering and Sience, MID-APRIL ISW, Vol. 36, NO. 7, pages 925 to 935. The content of the document is included by reference.

The strain hardening behaviour of polymers is analysed by Rheotens apparatus (product of Göttfert, Siemensstr. 2, 74711 Buchen, Germany) in which a melt strand is elongated by drawing down with a defined acceleration. The haul-off force F in dependence of draw-down velocity v is recorded.

The test procedure is performed in a standard climatized room with controlled room temperature of 23° C. and 30 bar. The Rheotens apparatus is combined with an extruder/melt pump for continuous feeding of the melt strand. The extrusion temperature is 200° C.; a capillary die with a diameter of 2 mm and a length of 6 mm is used. The strength length between the capillary die and the Rheotens wheels is 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec$^2$. The Rheotens was operated in combination with the PC program EXTENS. This is a real-time data-acquisition program, which displays and stores the measured data of tensile force and drawdown speed.

Grammage of the Web

The unit weight (grammage) of the webs in g/m$^2$ was determined in accordance with ISO 536:1995.

Average Fiber Diameter in the Web

The number average fiber diameter was determined using scanning electron microscopy (SEM). A representative part of the web was selected and an SEM micrograph of suitable magnification was recorded, then the diameter of 20 fibers was measured and the number average calculated.

2. Preparation of the Examples

Preparation of PP A1

Catalyst

A metallocene catalyst as described in example 1 of EP 1741725 A1 was used for the preparation of the propylene homopolymer PP 2.

Polymerisation

The propylene homopolymer PP A1 has been produced in a Borstar PP pilot plant as follows: The catalyst was fed together with triethylaluminium as cocatalyst with a Al/Zr ratio [mol/mol] of 911 into a stirred tank prepolymerization reactor together with propylene and hydrogen in a ratio of 0.19 mol/kmol propylene, the reactor being operated at 35° C. with an average residence time of 0.4 hours. The main polymerization step was carried out in a loop reactor at a temperature of 70° C. and a pressure of 6000 kPa feeding additional propylene at 150 kg/h with hydrogen in a ratio of 0.70 mol/kmol propylene, maintaining an average residence time of 0.65 hours, achieving a catalyst productivity of 17.6 kg/g. After deactivation of the catalyst with steam and drying of the resulting polymer powder with warm nitrogen, the resulting polypropylene homopolymer was compounded together with 0.07 wt % Calcium Stearate and 0.60% Irganox B225 (antioxidant combination supplied by Ciba Specialty Chemicals) in a twin screw extruder at 230 to 250° C.

The resulting propylene homopolymer has an MFR2 (2.16 kg, 230° C.) of 900 g/10 min, a density of 902 kg/m$^3$, a melting point of 153° C. and an XS content of 1.4 wt.-%. The GPC determination resulted in a weight average molecular weight (Mw) of 69 kg/mol, a number average molecular weight (Mn) of 30 kg/mol and a MWD (Mw/Mn) of 2.3.

Preparation of PP A2

The same catalyst and polymerization procedure as for PP A1 was applied, however using a hydrogen feed in a ratio of 0.75 mol/kmol propylene, maintaining an average residence time of 0.60 hours, achieving a catalyst productivity of 15.6 kg/g. Deactivation and additivation were again performed identically as for PP A1. The resulting propylene homopolymer has an MFR2 (2.16 kg, 230° C.) of 980 g/10 min, a density of 902 kg/m$^3$, a melting point of 153° C. and an XS content of 1.1 wt.-%. The GPC determination resulted in a weight average molecular weight (Mw) of 63 kg/mol, a number average molecular weight (Mn) of 27 kg/mol and a MWD (Mw/Mn) of 2.3.

TABLE 1

Properties of the polypropylene homopolymers PP-A1 and PP-A2

|  |  | PP-A1 | PP-A2 |
|---|---|---|---|
| $MFR_2$ (230° C.) | [g/10 min] | 900 | 980 |
| $M_w$ | [kg/mol] | 69 | 63 |
| MWD | [—] | 2.3 | 2.3 |
| Tm | [° C.] | 153 | 153 |
| ΔHf | [J/g] | 105.3 | 108.3 |
| Tc | [° C.] | 118 | 117 |
| ΔHc | [J/g] | 103.5 | 98.3 |
| XCS | [wt.-%] | 1.4 | 1.1 |
| g' | [—] | 1.0 | 1.0 |

The PP-A1 and PP-A2 were blended with low MFR materials HMS-PP and PP-B summarised in Table 2. The powder material PP-C was added to some blends in order to improve miscibility of the low and high MFR components

TABLE 2

Properties of the HMS-PP, the propylene homopolymer PP-B and the polypropylene homopolymer PP-C

|  |  | HMS-PP | PP-B | PP-C |
|---|---|---|---|---|
| $MFR_2$ (230° C.) | [g/10 min] | 6.0 | 8.2 | 80 |
| Density | [kg/m³] | 905 | 905 | 905 |
| Tm | [° C.] | 165 | 164 | 164 |
| XHI | [wt.-%] | 0.35 | 0.0 | 0.0 |
| XCS | [wt.-%] | 2.5 | 1.2 | 1.8 |
| g' | [—] | 0.64 | 1.0 | 1.0 |

HMS-PP is the is the commercial high melt strength polypropylene Daploy™ WB180HMS of Borealis AG based on a propylene homopolymer, wherein the high melt strength polypropylene Daploy™ WB180HMS has a melt strength of 11.5 cN at a maximum speed of 242 mm/s, PP-B is the commercial propylene homopolymer HD601CF of Borealis AG wherein no 2,1-insertions of propylene monomers in the chain are detectable by $^{13}$C-NMR spectroscopy

TABLE 3

Blends for melt blown trials

|  |  | IE 1 | IE 2 | IE 3 | IE 4 | IE 5 |
|---|---|---|---|---|---|---|
| PP-A1 | [wt.-%] | 90 | 90 | 98 | — | — |
| PP-A2 | [wt.-%] | — | — | — | 85 | 85 |
| HMS-PP | [wt.-%] | 10 | — | 2 | 10 | — |
| PP-B | [wt.-%] | — | 10 | — | — | 10 |
| PP-C | [wt.-%] | — | — | — | 5 | 5 |
| Tm | [° C.] | 154 | 156 | 154 | 156 | 156 |
| $MFR_2$ (230° C.) | [g/10 min] | 300 | 340 | 445 | 500 | 545 |
| XCS | [wt.-%] | 1.5 | 1.4 | 1.4 | 1.3 | 1.2 |
| XHI | [wt.-%] | 0.04 | 0.0 | 0.01 | 0.04 | 0.0 |

The blends were tested on the Reicofil melt blown pilot line using a die with holes of 0.4 mm diameter and 35 holes per inch. The melt temperature was set at 275° C. and the air temperature at 270° C. Additionally HL504FB of Borealis was tested as a visbroken reference material on the same pilot line. The effect of die to collector distance (DCD) and melt temperature on the processability and web properties were investigated. The basic weight was 120 g/m². The reported air volumes are the highest applicable ones which could be used without fly formation.

Maximum Applicable Air Volumes:

The maximum applicable air volumes are shown in FIG. 1 (DCD 180 mm, basis weight 120 g/m², melt temperature 275° C.). As depicted in FIG. 1, higher air volumes could be applied for all blends compared with the reference material PP-A2 and the commercial grade HL504FB. The highest possible air volume (550 m³/h, limitation from the pilot line) could be applied for blends IE 4 and IE 5.

Average Fibre Diameters:

The measured average fiber diameters and standard deviations are illustrated in FIG. 2. (DCD 180 mm, basis weight 120 g/m², melt temperature 275° C.).

Typically melt blown webs produced from the blends show smaller average fiber diameter compared with the reference base materials PP-A1 and PP-A2.

The FIGS. 1 and 2 demonstrate clearly that stretching strength of fibers made from polypropylene composition (PP-C) comprising a polypropylene (A) was improved by blending it with a low MFR polypropylene (B). This was seen as higher applicable air volumes and resulting thinner average fiber diameters.

The invention claimed is:

1. A polypropylene composition (PP-C) comprising:
  (a) a polypropylene (A) having
    (i) a melt flow rate MFR2 (230° C.) measured according to ISO 1133 of at least 450 g/10 min, and
    (ii) a molecular weight distribution (MWD) measured according to ISO 16014 of not more than 3.5, and
  (b) a polypropylene (B) having a melt flow rate $MFR_2$ (230° C.) measured according to ISO 1133 of equal or below 20 g/10 min,
  wherein the composition (PP-C) has a melt flow rate $MFR_2$ (230° C.) measured according to ISO 1133 of at least 200 g/10 min,
  wherein the polypropylene (B) is a high melt strength polypropylene (HMS-PP) and the high melt strength polypropylene (HMS-PP) has
  (a) a xylene hot insoluble (XHI) of below 1.0 wt. %, and/or
  (b) a xylene cold soluble content (XCS) measured according to ISO 6427 (23° C.) of equal or more than 2.0 wt. %, and/or
  (c) a branching index g' of less than 1.0, and/or
  (d) a melting temperature Tm measured according to ISO 11357-3 of at least 150° C.

2. The polypropylene composition (PP-C) according to claim 1, wherein the polypropylene (A) has
  (a) a weight average molecular weight (Mw) measured according to ISO 16014 of below 85,000 g/mol, and/or
  (b) a xylene cold soluble content (XCS) according ISO 6427 (23° C.) of not more than 2.5 wt. %, and/or
  (c) a Tm measured according to ISO 11357-3 of at least 150° C.

3. The polypropylene composition (PP-C) according to claim 1, wherein the composition comprises additionally a polypropylene (C) having a melt flow rate $MFR_2$ (230° C.) measured according to ISO 1133 in the range of 50 to 250 g/10 min.

4. The polypropylene composition (PP-C) according to claim 1, wherein the composition (PP-C) comprises
  (a) 75.0 to 99.5 wt.-% of the polypropylene (A),
  (b) 0.5 to 25.0 wt.-% of the polypropylene (B), and
  (c) 0 to 15.0 wt.-% of the polypropylene (C),
  based on the polypropylenes present in the composition.

5. Melt-blown fiber having an average diameter of not more than 5.0 µm, said fiber comprises, at least of 95 wt.-% of, a polypropylene composition (PP-C) as defined in claim 1.

6. Melt-blown fiber according to claim 5, wherein the fiber has been air-cooled.

7. Melt blown web comprising melt blown fibers according to claim 5.

8. Article comprising a melt blown fiber according to claim 5, said article is selected from the group consisting of filtration medium, diaper, sanitary napkin, panty liner, incontinence product for adults, protective clothing, surgical drape, surgical gown, and surgical wear.

9. Article according to claim 8, wherein the article comprises additionally a spunbonded fabric.

10. Process for the preparation of a melt blown web according to claim 5, wherein a the polypropylene composition (PP-C) has been melt blown by using a melt blown plant having a die with holes of 0.3 to 0.5 mm diameter and 10 to 16 holes per cm.

\* \* \* \* \*